United States Patent [19]

Casper

[11] 4,294,700
[45] Oct. 13, 1981

[54] SUBMERGED LARGE DIAMETER SEAL

[75] Inventor: Thomas J. Casper, Waukesha, Wis.

[73] Assignee: Envirex Inc., Waukesha, Wis.

[21] Appl. No.: 47,191

[22] Filed: Jun. 8, 1979

[51] Int. Cl.³ .............................................. B01D 33/10
[52] U.S. Cl. .................... 210/403; 277/81 R; 277/138
[58] Field of Search ............... 210/393, 394, 402, 403, 210/404, 408, 409, 411, 499, 108, 232, 215, 217, 793; 277/12, 81, 82, 138, 165; 162/323, 357; 209/288, 294, 403

[56] References Cited

U.S. PATENT DOCUMENTS

| Re. 24,940 | 2/1961 | Stephens | 277/82 |
|---|---|---|---|
| 1,166,882 | 1/1916 | Beaumont . | |
| 1,237,280 | 8/1917 | Beaumont . | |
| 1,505,835 | 8/1924 | White . | |
| 2,061,257 | 11/1936 | Sablik | 210/198 |
| 2,092,252 | 9/1937 | Hillier | 210/199 |
| 2,599,034 | 6/1952 | Wilkenson | 277/81 |
| 2,894,635 | 7/1959 | Irthrum et al. | 210/402 |
| 3,059,778 | 10/1962 | Rabbitts | 210/297 |
| 3,275,150 | 9/1966 | Tait | 210/327 |
| 3,409,139 | 11/1968 | Jackson et al. | 210/404 |
| 3,486,313 | 12/1969 | Thomas | 55/400 |
| 3,681,239 | 8/1972 | Angelinetta | 210/402 |
| 4,038,187 | 7/1977 | Saffran | 210/402 X |
| 4,123,362 | 10/1978 | Mansouri | 210/394 X |

Primary Examiner—Ferris H. Lander

[57] ABSTRACT

The open inlet end of a microscreen drum is defined by a circular track which is supported on rollers above the flow. The stationary wall supporting the rollers carries a flange-type flexible seal extending in a partial circle around the opening in the wall. The track carries a fully circular flange and a low-friction, slit tubing covers its axially projecting edge and is engaged by the flexible seal.

4 Claims, 6 Drawing Figures

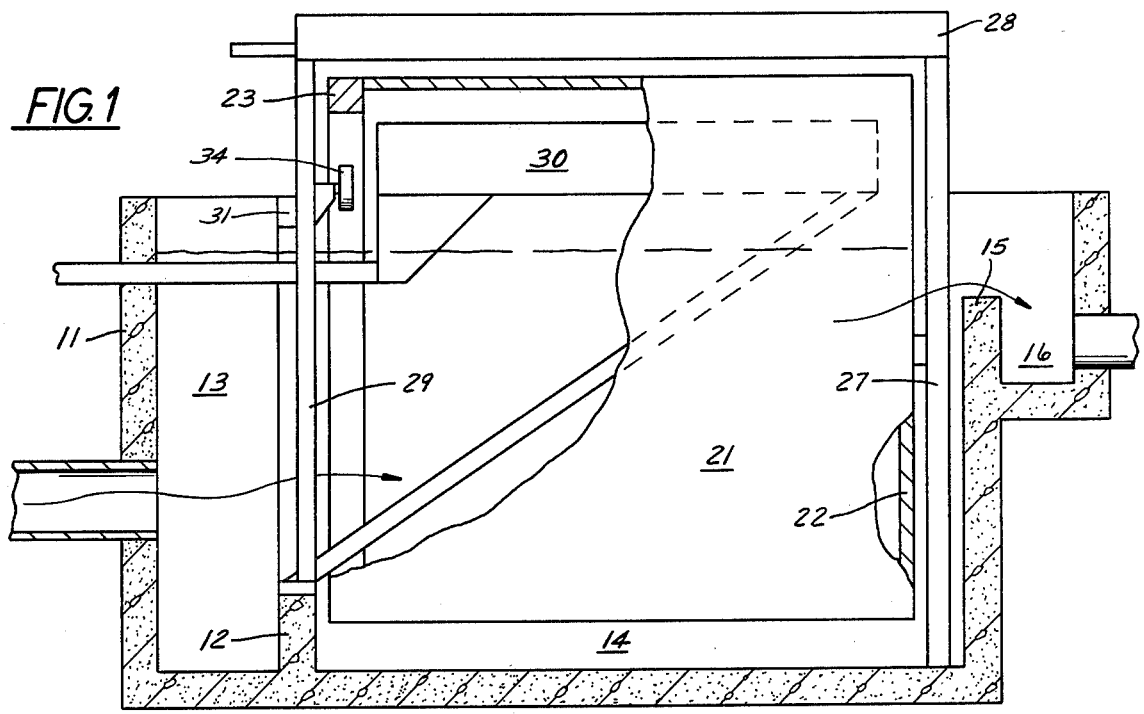
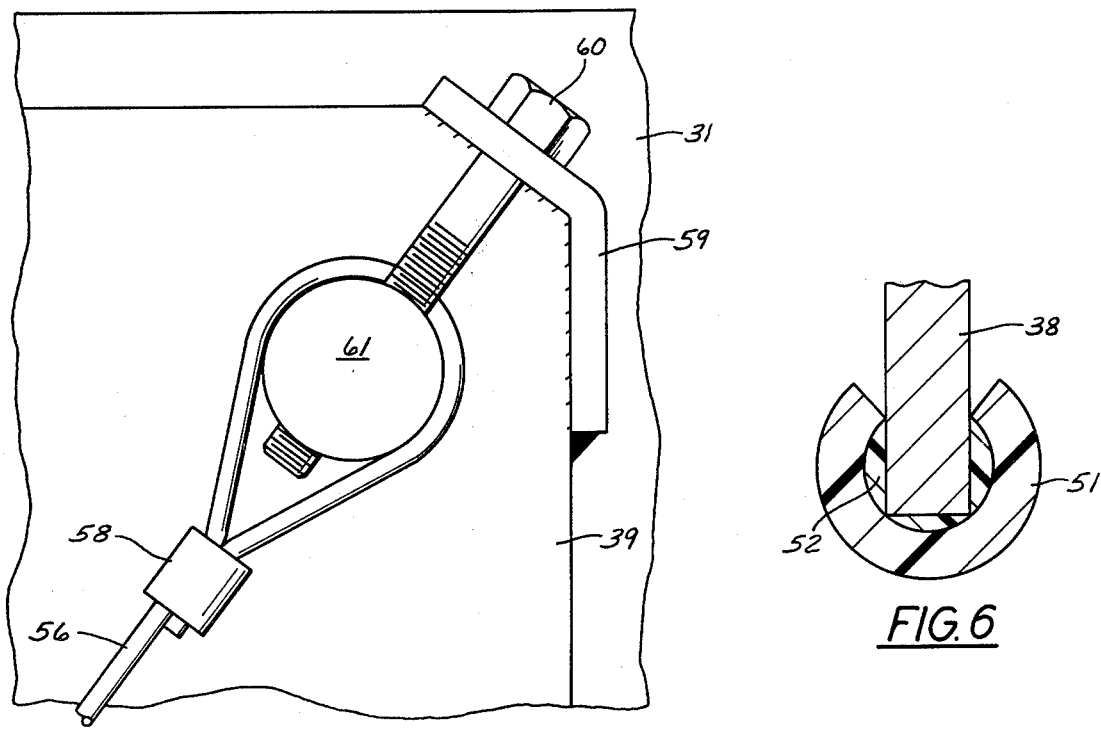

SUBMERGED LARGE DIAMETER SEAL

BACKGROUND OF THE INVENTION

U.S. Pat. No. 4,038,187 is directed to improvements in microscreen drums and includes the specifications of a typical installation. In particular, the drum has a diameter of ten feet (3.104 meters). U.S. Pat. No. 4,123,362 is directed to an improved seal for such drum screen where flushing of the seal is required. The seal engages a machined surface of the drum track and prevents the unscreened water within the drum from escaping into the drum well containing the water which has passed through the screening of the drum.

All such seals must accommodate any eccentricity, out-of-roundness, misalignment and end play of the drum relative to its stationary parts. For practical reasons, all such seals should be readily installed after the drum is assembled and installed in the drum well and in particular, should be readily replaced without having to remove the drum from the drum well.

Typically, the upper one-fourth of the drum is above the flow to allow for backwashing of the screening. Accordingly, the circular element of the seal which is stationary may be discontinuous, provided only that its two ends extend above the maximum elevation of the flow. This element, of whatever form, is readily applied as shown in U.S. Pat. No. 4,123,362. That is, it is provided with a flat base which is held by a surrounding band against a circular rim projecting into the drum.

The search for a suitable rotating element has been more difficult. In the patent just mentioned, it is a machined, structural part of the drum track. Elements which are to be applied after the drum screen is installed must comprise segments of a circle, or comprise one or more lengths of material which may be curved and assembled to comprise a full circle.

The present invention provides an improved stationary element and utilizes a strip of material which is readily installed and forms a complete circular rotating element with virtually no gap between its abutting ends through which water may pass and with no projecting step which may cause some damage to one end of the stationary element.

SUMMARY OF THE INVENTION

The seal of the present invention has particular utility in a drum screen having a drum which is partially submerged in the screened water contained by the drum well. The flow enters the drum through an opening in one wall of the well and the adjoining open end of the drum. A circular flange is carried by the drum track defining the open end of the drum and projects into the drum. A flexible tubing having a lengthwise open seam or gap is first partially filled with a chemically inert, mechanically plastic material and is then applied over the axially projecting edge of the flange. The tubing is cut to a length so that its ends abut perfectly and form a tightly closed joint which will move smoothly over the end of and onto the flange of the other element with each drum revolution. The hygroscopic elongation of the tubing due to growth is considered in determining the length referred to. The material with which the tubing is partially filled remains mechanically plastic indefinitely or at least for a period sufficient to allow such growth when the drum screen is placed in operation.

The other element is a flange type seal element which is banded over a circular rim extending from the end wall referred to and into the drum. The flange of this element is pressed against the tubing by the pressure of the water within the drum. The seal may also be used to close the gap between any relatively large, relatively rotating parts where it is impracticable to mold either or both of the elements in a continuous loop.

BRIEF DESCRIPTION OF THE DRAWINGS

FIG. 1 is a vertical, longitudinal section of a drum type microscreen installation. The stationary structure is partially broken away to show the inlet opening in one wall forming the drum well.

FIG. 5 is a further enlarged view of the means for tightening the band which secures the stationary element on its circular support rim.

FIG. 6 is a further enlarged section of the movable element of the seal and its mounting flange.

DESCRIPTION OF THE PREFERRED EMBODIMENT

Figure 2:
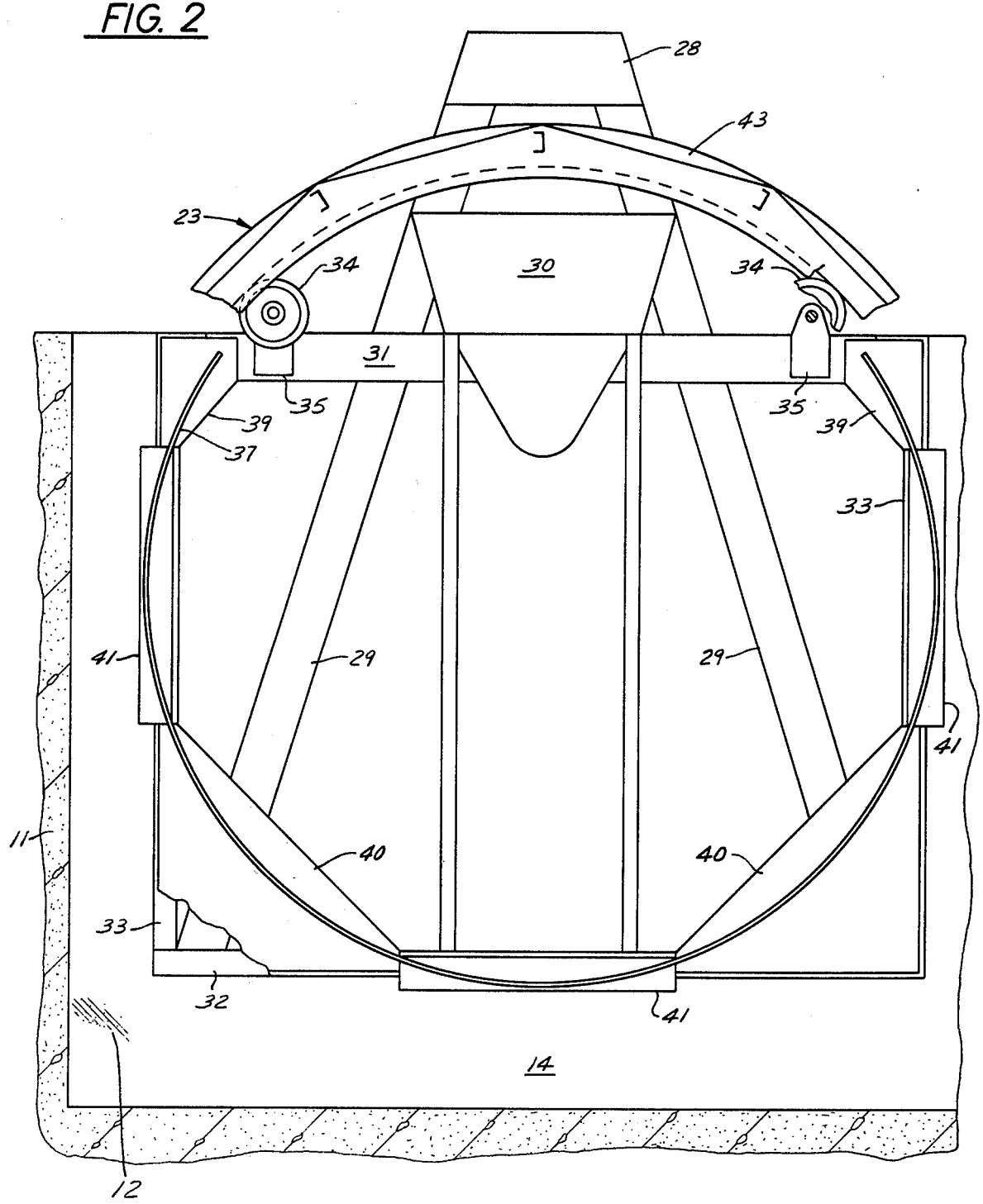
FIG. 2 is an elevation of the wall having the inlet opening as viewed from within the drum well. Various parts are broken away and sectioned.

The concrete structure 11 shown in FIG. 1 is typical and includes the wall 12 which separates the feed well 13 from the drum well 14. Wall 12 is provided with a rectangular opening as shown in FIG. 2. Means, not shown, controls the flow into feed well 13 and the maximum elevation of the raw flow as shown. The screened flow from well 14 passes over weir 15 into the discharge trough 16.

Only the general construction of the rotatable drum 21 is shown in FIG. 1. It includes the closed end disc 22 and the structural ring 23 which forms the open end of the drum. Disc 22 is carried for rotation by the vertical support 27 which also carries one end of the backwash spray system 28. The vertical supports 29 which are set in the opening of wall 12 carry the other end of the spray system 28. The screenings are received by the trough 30 supported within drum 21 for discharge therefrom.

The frame which fits in the opening of wall 12 includes the beam 31 and the lower and two side members 32 and 33 respectively. The ring 23 of drum 21 operates over the rollers 34 which are supported by the brackets 35 carried by beam 31 so that the open end of the drum is immediate to the opening in wall 12. The present invention provides an improved seal therebetween.

The two elements of the seal are carried by a stationary circular rim 37 and a circular flange 38 which is a part of the ring 23. Ring 23, rim 37 and flange 38 are, of course, concentric.

As shown in FIG. 2, the frame which fits in the opening of wall 22 also includes the upper and lower corner plates 39 and 40, respectively and the intermediate plates 41. Rim 37 projects axially from said plates into the drum and the two upper ends of rim 37 circumferentially extend to within a short distance of rollers 34 and as such also project above the level of the raw flow entering the drum.

Figure 4:
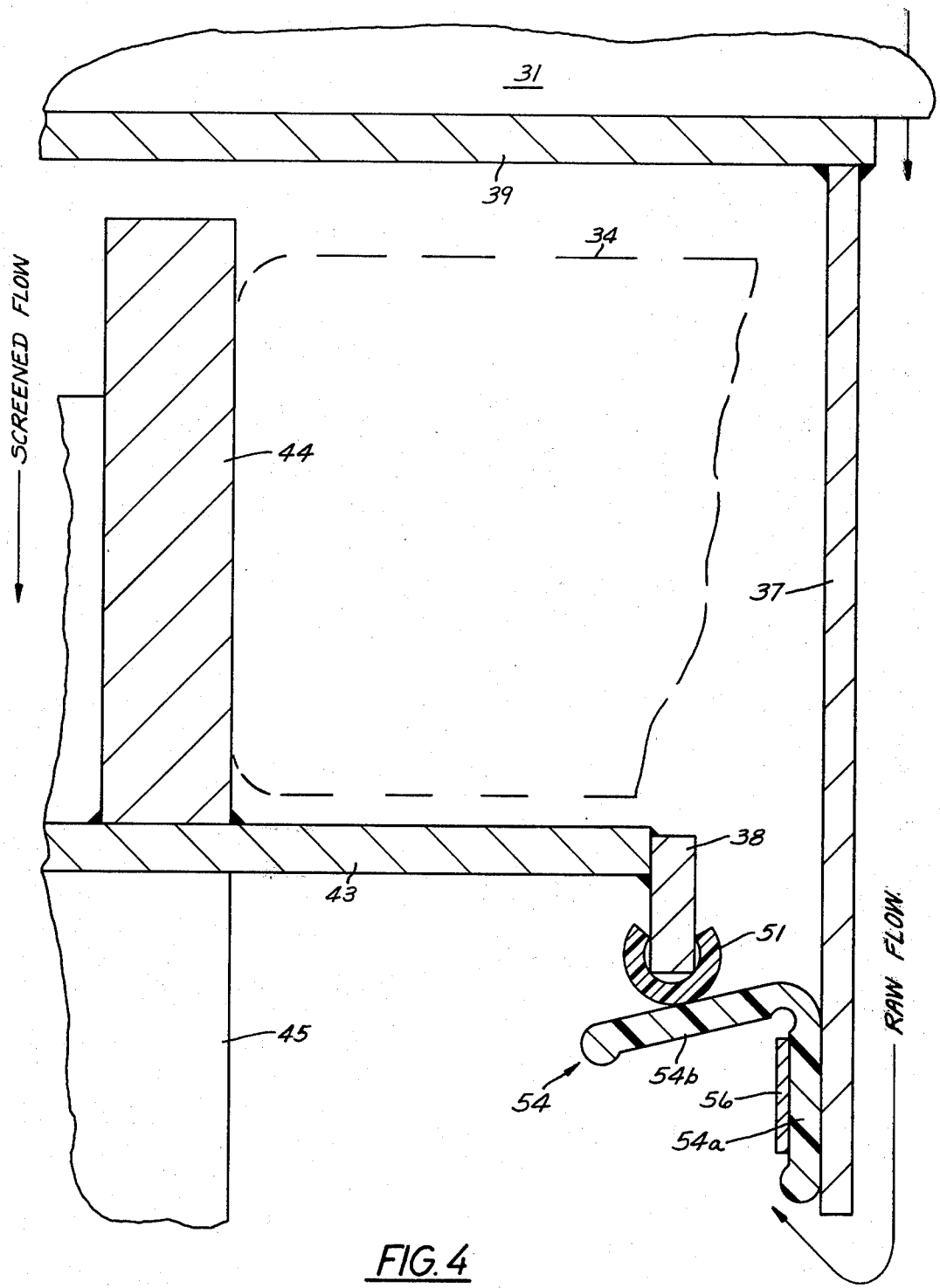
FIG. 4 is an enlarged section taken on line 4—4 of FIG. 3 showing the details of construction of the two elements of the seal and their supports.

The ring 23 of drum 21 includes the circular plate 43 which surrounds rim 37 and the drum track 44 which is welded to one side of plate 43. Beams 45 extend axially from the other side of plate 41 to end disc 22 and with other cross-members, not shown, carry the screen panels 46. A preferred form of screen panel is shown in U.S. Pat. No. 4,038,187. As shown in FIG. 4, the flange 38 is welded to the inner periphery of plate 43. In a preferred embodiment of the invention, flange 38 is formed from a steel strip which is ⅜ inches (1.06 cm) in thickness and is one inch (2.5 cm) wide.

The rotating element of the seal comprises a length of tubing 51, which is slit lengthwise. The tubing may be of any suitable wear resistant, low friction plastic. A one inch (2.5 cm) polyethelene tubing having an inside diameter of about ½ inch (1.25 cm) will suitably fit over the edge of flange 38 as described after the tubing has been slit. In particular, the length of the tubing should correspond with the peripheral length of the edge referred to after allowance is made for the hygroscopic growth of the tubing which may occur. With a drum having a diameter of eight feet (2.42 m), an approximately 30 foot (9.09 m) length of tubing will be required and typically a growth of about 3/16 inches (0.52 cm) may have to be allowed for.

Prior to assembly, the tubing is partially filled with a mechanically plastic material 52 such as a room temperature vulcanizing (RTV) silicone adhesive. The Dow Corning silicone adhesive No. 732 is illustrative. In particular the material should have adequate adhesive properties so that it adheres to flange 38.

Tubing 51 may be applied to flange 38 before drum 21 is put in place. However, the tubing is readily applied as the drum is rotated merely by pressing the tubing progressively by hand onto flange 38 so that the portion of the flange and the adhesive material form a bead over which the tubing is then fitted, as shown in FIG. 6. As is known, polyethelene is not a material with which other materials readily bond. This and the slow or non-hardening properties of the adhesive are important to allow the tubing to move peripherally on flange 38 as it grows. The importance here is to assure that the tubing does not push itself off of the flange because of being too long, and also to assure that the two ends of the tubing abut and form a smooth joint.

The stationary element of the seal comprises the extruded L-shaped strip 54 of a wear resistant elastomeric material such as polyurethane. It comprises a base 54a and a flange 54b which are of similar section and at right angles as extruded. As shown, each of the two free edges may have a small bead. The thinner intermediate section allows the flange to bend more freely. The general stiffness of the flange is desirable, as will be mentioned.

Figure 3:
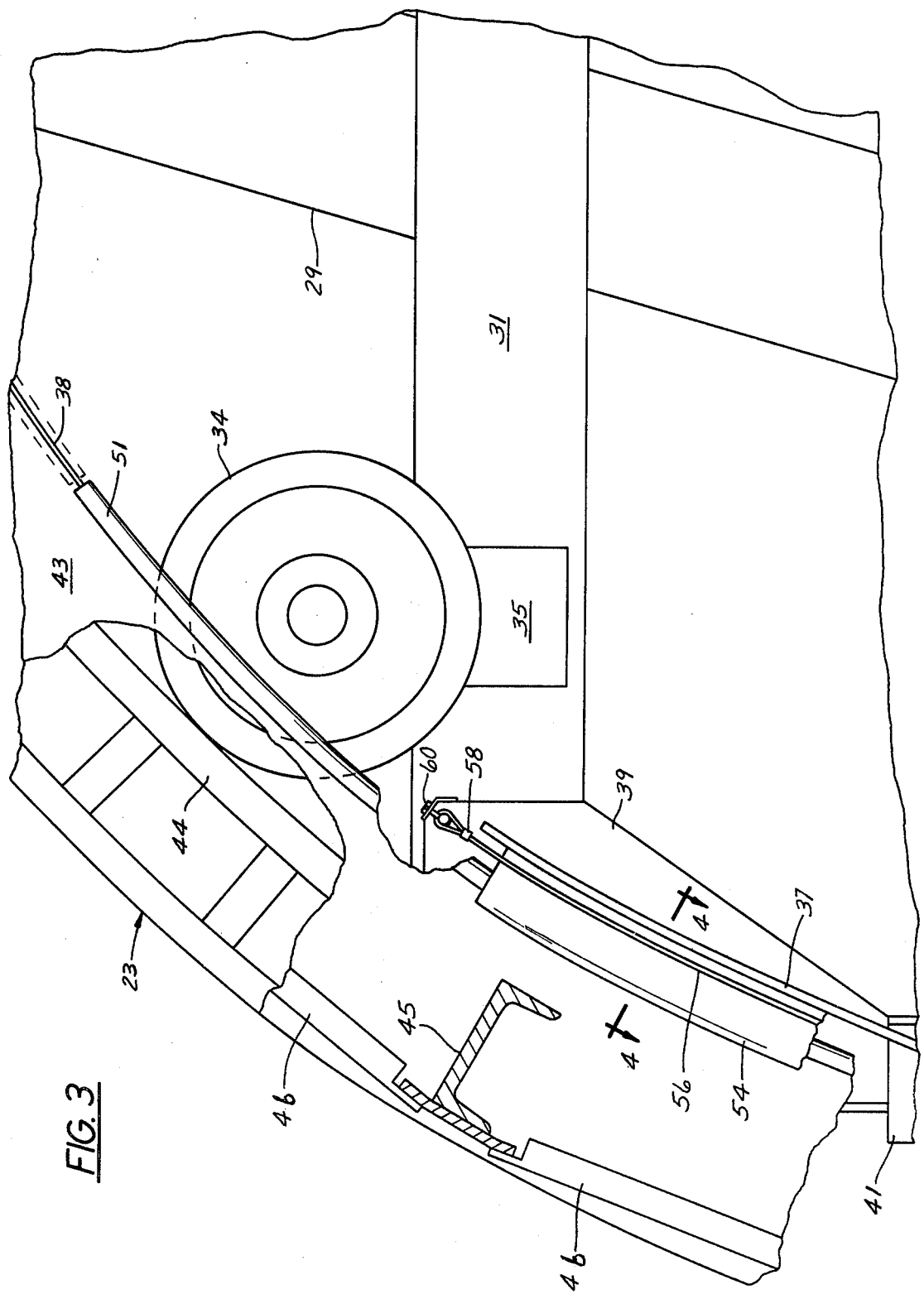
FIG. 3 is an enlarged view of a portion of the drum and of the seal as viewed from within the drum.

The strip 54 is drawn around rim 37 and is held in place on rim 37 by the surrounding metal band 56 which presses base 54a against the outer face of rim 37 as shown in FIG. 4. Before tightening band 56, the strip is positioned axially so that flange 54b is pressed against tubing 51. While the ends of the tubing will form a smooth joint, the corners at the ends of the tubing may be rounded very slightly, for smoothness. Assuming the counterclockwise rotation of the drum as viewed in FIG. 3, the end of flange 54b of the Figure may be chamfered particularly so that while the gap between the ends of tubing 51 is closing, the leading end of the tubing will not become caught on the end of flange 54b.

Various means for tightening band 56 may be provided, preferably at each end of the band. One such means is shown in FIG. 5. The ferrule 58 secures the free end of band 56 in the form of a loop. The bracket 59 projecting from plate 39 carries two bolts including the bolt 60. The two bolts are threaded in the ends of the pin 61 extending through the loop whereby turning the two bolts draws pin 61 toward bracket 59 and tightens the band as required.

In the operation of the microscreen drum, the flow through the screening of the drum is effected by the higher elevation of the raw flow within drum 21 relative to that of the screened flow within drum well 14. The pressure due to such higher elevation firmly holds flange 54b against tubing 46. In that regard, flange 54b as shown is 1½ inches (3.75 cm) wide (radially). Flange 54b is relatively stiff so that its radial dimension and such stiffness allows considerable variations in its positioning relative to tubing 46 without loss of a sealing engagement therewith. Also, the elements of the seal may be formed of stable thermoplastic or elastomeric materials which are unaffected by being indefinitely under water or exposed to such mildly active chemicals in the raw flow to be screened and are abrasion resistant so as to be unaffected by the grit which is typically also present.

I claim:

1. A seal to close an opening of relatively large diameter between two relatively rotating parts and against the flow of liquid therebetween, one such part having a rim adjacent to said opening and the other part having a circular flange surrounding said rim, said flange projecting axially with respect to the relative rotation of the parts and having a continuous edge defining a plane normal to said axis, said seal comprising (1) an open seamed tubing of a flexible, wear resistant material adapted to be opened at the seam and fitted over said flange with inner side of the tubing opposite the seam pressed against said edge of the flange and with aligned and abutted ends, and (2) an element of a molded wear resistant material and including a flat base which may be drawn around the outside of said rim and clamped thereto, said element further including a radially projecting flange having a bendable connection with said base so as to be pressed by the liquid pressure against the tubing.

2. A drum screen comprising a rotatable drum having one end provided with a central opening to receive the raw flow, a drum well surrounding the lower part of the drum to receive the screened flow through the drum periphery, one wall of the drum well being provided with an opening which adjoins the opening of said one end of the drum, said one end of the drum having an inwardly extending circular flange, said flange having an end face which is normal to the axis of rotation of the drum, said one wall having a circular rim which is concentric with said flange and extends into the drum through the opening of said one end thereof, and a seal to function between said end of the drum and said wall of the drum well, said seal comprising (1) a seamed tubing of a flexible, low friction material fitted over said flange, said tubing being of one of two forms, one form being a circular element of integral construction, the second form being a linear element with aligned and abutted ends, said tubing being opened at the seam and assembled on said flange with its inner side opposite the seam pressed against the end face of the flange, and (2) a stationary element of a molded wear resistant material and including a flat base which is drawn around the outside of said rim and clamped thereto, said stationary element further including a radially projecting flange which is pivotally movable relative to and pressed by the raw water within the drum against the tubing.

3. The drum screen of claim 2 further having rollers which are carried by said wall above the opening thereof and supporting said one end of the drum of wherein the stationary element and rim have ends extending above said opening and the raw flow therethrough.

4. In an installation for processing a liquid including a rotating structure and a support structure, one of said structures having a circular rim and the other having a surrounding axially extending flange, said flange having an end face which is normal to the axis of said rotating structure, a seal comprising a fully circular, low friction element and a circular elastomeric element, said elastomeric element having a flat base which is clamped around said rim and a radially outward projecting flange, said low friction element having a circular section fitted over said surrounding axially extending flange and to be engaged by the radially outward projecting flange of the elastomeric element, said low friction element comprising a seamed tubing of which the inner side opposite the seam is pressed against the end face of the axially extending flange and the corresponding outer side is engaged by the radially outward projecting flange of the elastomeric element said radially outward projecting flange being pivotally movable relative to and pressed by said liquid being processed within said installation against said tubing.

* * * * *